United States Patent Office 2,820,743
Patented Jan. 21, 1958

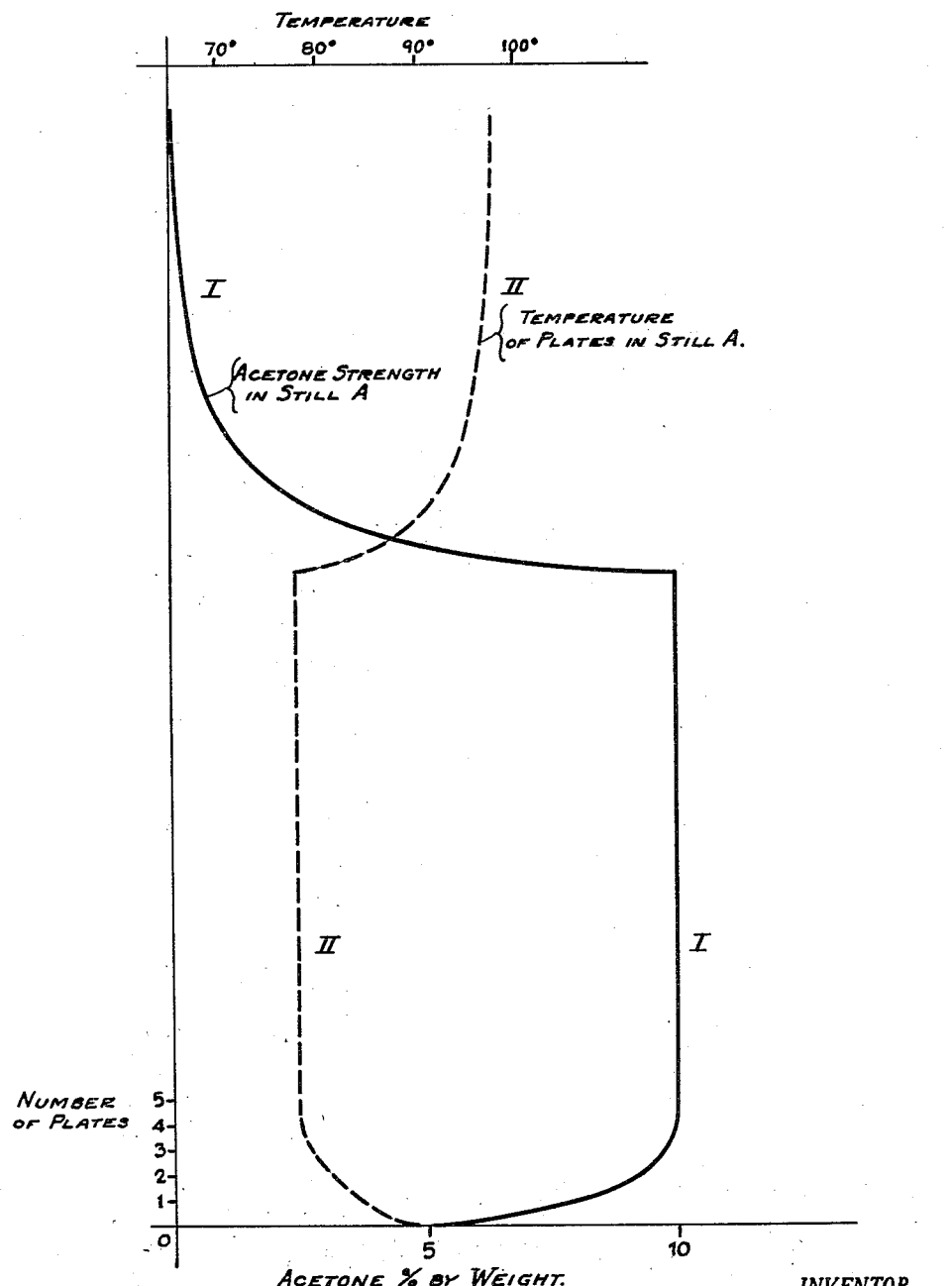

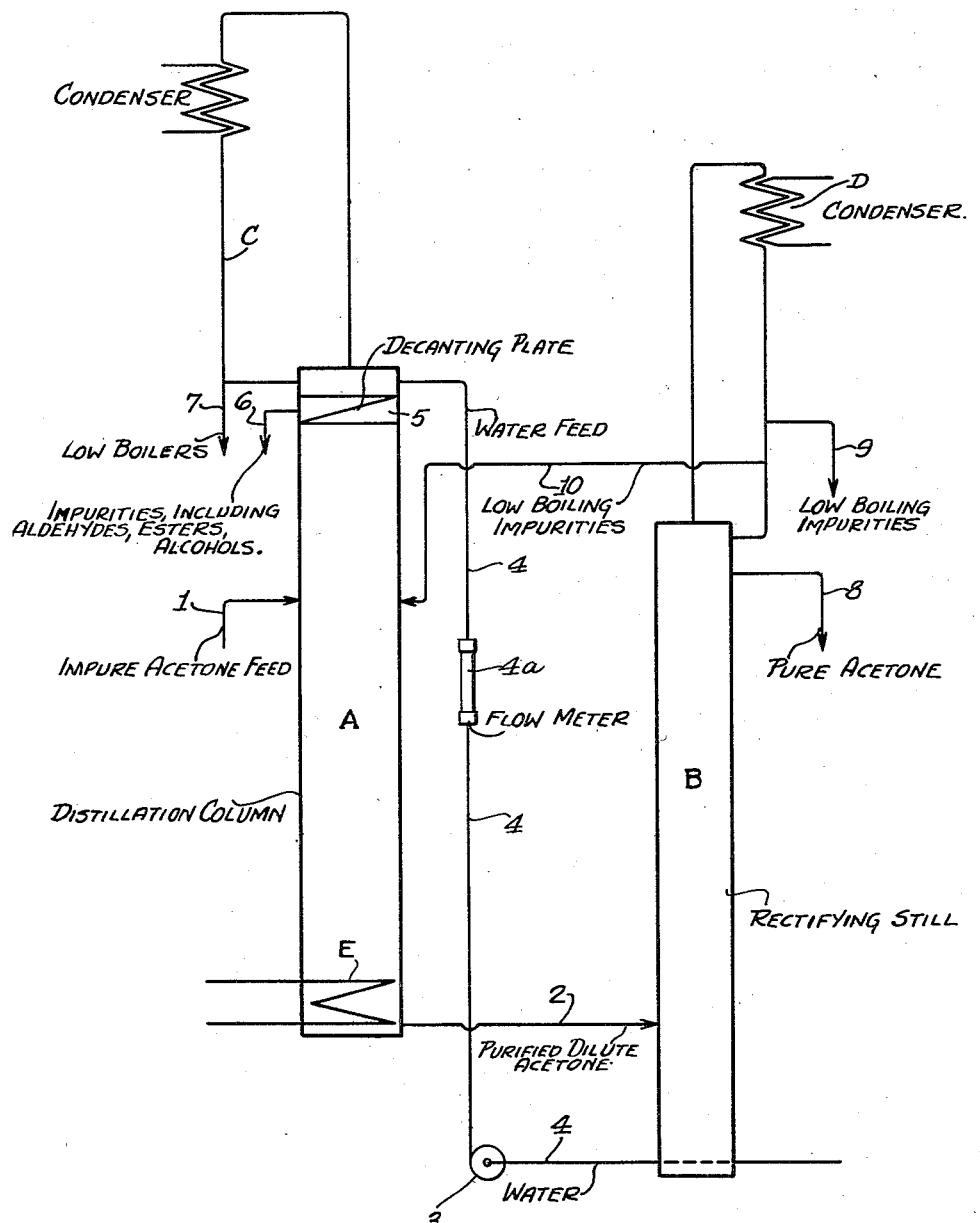

2,820,743
PROCESS OF PURIFYING ACETONE BY EXTRACTIVE DISTILLATION

Maurice Mention and Louis Alheritiere, Melle, Deux-Sevres, France, assignors to Les Usines de Melle (Societe Anonyme), Saint-Leger-les-Melle, France, a corporation of France Application September 16, 1952, Serial No. 309,850

Claims priority, application France October 2, 1951

6 Claims. (Cl. 202—39.5)

This invention relates to a process for purifying acetone, more particularly acetone obtained from fermentation processes.

Acetone as obtained by rectifying the liquids or phlegms obtained from acetobutylic fermentation contains traces of impurities in amounts which cannot be estimated with conventional analytic methods but which interfere with the use of such material in the manufacture of condensation products such as diacetone alcohol. Such impurities either cause a lowering of efficiency of the alkaline condensation catalyst, the amount of which must then be increased, or they may inactivate the catalyst altogether. In addition traces of impurities cause production of mesityl oxide with darkening of the diacetone alcohol during rectification of the condensation product. The traces of impurities effecting the above-mentioned difficulties of interference with the catalyst and production of inferior discolored products cannot be conveniently estimated with conventional analytic methods but are roughly estimated by the time required by the "potassium permanganate test."

In the permanganate test 100 parts of the acetone to be tested is mixed with 1 part of a 0.1% aqueous solution of potassium permanganate. Acetone of conventional good quality should not product discoloration of the permanganate is less than 20 minutes. Such quality acetone should also be free from any traces of acids. However, such quality is not always sufficient, particularly if the acetone is to be used for manufacturing diacetone alcohol.

A number of chemical treatments have been devised for removal of the said impurities, for example a scrubbing with an alkaline solution and then with a solution of potassium permanganate before rectifying, or the alkaline solution and permanganate have been supplied to the rectifying stills. These treatments generally require a new distillation of the chemically treated acetone. Furthermore with such processes the acetone produced sometimes undergoes condensation only with difficulty.

The principal object of the present invention accordingly is to provide a simple process for the purification of impure acetone, to produce a pure product, which will do away with at least some of the difficulties heretofore encountered.

The invention accordingly consists of the novel processes and steps of processes, specific embodiments of which are described hereinafter by way of example and in accordance with which we now prefer to practice the invention.

Now it has been found that it is possible to remove the said impurities by a simple physical separation and to obtain a highly pure acetone capable of giving long permanganate discoloration time up to 24 hours or more. The acetone so purified may be used directly to produce on a commercial scale a high-quality diacetone alcohol meeting the generally adopted conventional requirements.

In accordance with the present invention impure acetone, possibly in the form of aqueous mixture is fed to the mid-section of a distilling column while water at approximately its boiling point is fed to the top section of the column in an amount to keep the aqueous acetone concentration between the top of said column and the acetone feed point at 1–10% by volume and between said feed point and the base of the column at not over 15% by volume, the concentration at the base of the column being of 2–10% by volume. Under these conditions the impurities collect at the top of the column from which vapors containing them are withdrawn and condensed, and part thereof is discarded and the remainder is refluxed. The impurities can thus be collected in such a concentrated state on a decanting plate as to permit separation thereof through decantation in the apparatus. The impurities discarded generally amount to 1–10%, more particularly about 1–2.5% by volume with respect to the impure acetone fed to the column. The purified aqueous acetone is discharged from the base of the column. This aqueous acetone is then fed to a conventional rectifying column operated in accordance with standard practice. Pure acetone of 99.5% strength, the remainder being water, is withdrawn in liquid form from one of the top plates of this column, the boiling water obtained at the base being preferably recirculated to furnish the water at the top of the still into which the crude acetone is fed.

Under the conditions where the concentration of acetone above the acetone feed point is of 1–10% by volume with a concentration between the feed point and base of 2–15% by volume all impurities including those having a very high boiling point (up to 240° C.) become more volatile than acetone. Separation of such impurities is more efficient as the acetone strength is lower.

More particularly, it has been found that the separation of impurities from impure acetone can be achieved very easily in a distilling column of conventional type having a sufficient number of plates, if the following conditions are observed:

(a) Acetone to be purified is fed in liquid condition, either cold or hot, to the middle portion of a distilling column which is heated at its base as required for practically completely exhausting acetone from impurities. The amount of heat essentially depends on the kind of the impurities and may vary from 400 to 1000 calories per kg. of acetone treated.

(b) Water for suitably diluting acetone is fed at or near its boiling point to the top section of the column in such an amount that the purified acetone withdrawn from the base of the column has a predetermined strength in the range 2%–10% by vol. Where the acetone to be treated contains highly volatile impurities, such as acetaldehyde, it may be desirable to space the water feed point by the distance of a few plates from the very top of the column, whereby those impurities can concentrate on these plates.

(c) The impurities are withdrawn from the top section of the column in a highly concentrated state, permitting separation of them if desired by means of a suitable decanter arranged either within the column at the level of the water feed, or in the reflux line from the condenser to the column.

(d) The heating of the column and the water feed are so proportioned that the maximum strength of acetone on the plates in the middle section of the column below the acetone feed point, is not higher than 15% by vol., and that the acetone strength in the water scrubbing section, i. e. above the acetone feed point, is as low as possible (preferably from 1 to 10% by vol.). Under such conditions the impurities are carried up to the top section of the column while the acetone is carried down to the bottom section; as a consequence the gradient of temperatures along the column is such that the higher temperatures are found on the plates in the water scrubbing section and the lower temperatures are found on the plates in the middle section of the column, just below the acetone feed point.

(e) The amount of impurities withdrawn from the top section in admixture with some acetone generally varies between 1% and 2.5% by volume of the acetone feed; in some cases it may be higher, up to about 10%.

(f) The purified acetone withdrawn from the base of the column is fed to a conventional rectifying column operated in accordance with approved techniques. Acetone of 99.5% strength (the remainder being water) is withdrawn in liquid form from one of the top plates of this column, while boiling water withdrawn from the base thereof is recycled by controlled amounts to the top section of the first distilling column.

Generally a few plates are provided in the rectifying column above the acetone withdrawal point, with a view to separating small amounts of impurities having an acid reaction (alkyl formates) which might have been carried through the purifying column, and possibly carbon dioxide contained in the heating steam, where live steam is employed as a heating agent.

In the accompanying drawings forming part of this application we have shown a diagram giving curves showing the variation of acetone strength and temperature on the plates of the column into which the acetone is fed as well as an apparatus in which the process may be carried out. In these drawings, Fig. 1 shows curves I and II, curve I showing the acetone strength in column A of Fig. 2 and curve II showing the temperature of plates in column A, the number of plates being shown as ordinates and the acetone percent and the temperature as abscissa, and Fig. 2 shows a diagrammatic form of apparatus which may be employed for carrying out the process. It is obvious that other forms of apparatus may be employed.

Referring now to Fig. 2, cold or hot, liquid acetone to be treated is fed to column A through pipe 1. Purified, diluted acetone is withdrawn through pipe 2 and fed to column B in which acetone is separated from water.

Water to be used for scrubbing in column A is taken from the wash exit of column B and raised by a pump 3 through a pipe 4, fitted with a flowmeter 4a, to the top section of column A.

In the top portion of column A is provided a decanting plate 5, i. e. a plate having a chimney through which the vapors can rise freely without bubbling through the liquid on the plate, from which the upper layer having a high content of impurities is withdrawn through pipe 6, said decanting plate 5 being preferably just below the water feed point. Water thus passes into column A and flows onto the decanter plate 5, which as stated is just below the water feed point.

Alternatively, the decanter may be inserted in the reflux pipe C from the condenser to the top of column A.

A portion of the liquid flowing from the condenser is withdrawn through pipe 7 for the removal of low-boiling impurities.

Pure, concentrated acetone is withdrawn in liquid condition from the top portion of column B through pipe 8.

With a view to removing low-boiling impurities, a portion of the liquid from the condenser D of column B is withdrawn through pipe 9 and another portion may be returned to column A through pipe 10, preferably at the feed point level, the remainder of the liquid being refluxed to column B.

Column A is heated preferably by means of a surface heating device E with a view to avoiding additional dilution of the acetone in the bottom portion, and disturbance in operation of column A.

It is advisable to feed as highly concentrated acetone as possible to column A through pipe 1, nevertheless our process is also efficient in purifying acetone which has been previously diluted up to 50%.

The yield of our process depends on the kind and amount of the impurities in the acetone to be treated, thus depends to some extent on the fermentation process producing such acetone. The yield can be as high as 95-98% of the weight of acetone to be treated.

Pressure different from atmospheric may be used if desired. It is within the scope of our invention to operate each column at a pressure different from that in the other column. If it is intended to recover heat, for example, we may employ heat available in the top section of column B operated at a superatmospheric pressure, for heating column A operated at atmospheric pressure, or conversely we operate column A at a subatmospheric pressure by means of the heat available in the top section of column B operated at atmospheric pressure.

Regarding the kind of the impurities decanted off from the top section of column A, complete analysis of these impurities shows that they comprise inter alia:

Acetaldehyde
Propionaldehyde
Alkyl formates
Mixed alkyl oxides (ethyl isopropyl oxide)
Esters (ethyl acetate, butyl acetate, butyl butyrate)
High boiling alcohols
High boiling fractions having boiling points up to 240° C.

As an illustration a sample of impurities withdrawn from the top section of column A, from an impure aceton product commercially known as "acetone heads," was fractionated by distillation and the results were as follows:

10% had a boiling range below 60° C.
20% had a boiling range of 60– 70° C.
30% had a boiling range of 70– 80° C.
5% had a boiling range of 80–110° C.
15% had a boiling range of 110–120° C.
10% had a boiling range of 120–150° C.
10% had a boiling range of 150–240° C.

Thus the acetone contains impurities boiling above 110° C. in minor amounts.

The bulk of impurities are withdrawn as a whole from the top section of colum A, while from the top section of column B only some traces of alkyl formates and carbon dioxide are removed.

The possibility of obtaining from the top section of column A, impurities having boiling points as high as 240° C., shows the high efficiency of the purification process of this invention.

The following are examples of the manner in which we now prefer to carry out our process. These examples are illustrative and the invention is not to be considered as limited thereto except as indicated in the appended claims.

Example 1

We continuously introduced into column A, through pipe 1, 101.5 kg. per hour of rectified acetone, which is chemically pure but the permanganate discoloration time of which is not over about 20 minutes. We also introduced, through pipe 4, 904.5 kg. per hour of water at 98° C. collected from the base of column B. The quantity of heat supplied to the base of column A amounted to 15,000 calories per hour.

We continuously withdrew through pipe 6, 0.1 kg. per hour of upper layer containing:

0.05 kg. of impurities partially soluble in water such as butyl alcohol, high boiling esters, and propionaldehyde,
0.02 kg. of acetone, and
0.03 kg. of water.

We also withdrew through pipe 7, 4.65 kg. per hour of a mixture consisting of 20% strength aqueous acetone containing the above-mentioned impurities in somewhat lesser amounts and in addition, a little acetaldehyde.

We refluxed to the top of column A 23 kg. per hour of the same water-acetone-impurities mixture.

Pure, 10% strength aqueous acetone flowed from the base of column A to column B through pipe 2. We withdrew through pipe 8, 100 kg. per hour of pure concentrated acetone, and through pipe 9, 0.5 kg. per hour of acetone heads.

The permanganate discoloration time of the pure acetone obtained was 6 hours; the permanganate discoloration time of the heads withdrawn through 9 was 3 hours: thus these heads consisted of very pure acetone.

In this operation the pipe 10 remained unutilized.

*Example 2*

We carried out the same operation as in Example 1, except that 5 kg. per hour of the heads from column B were returned to column A through pipe 10. Then the permanganate discoloration time of the pure acetone withdrawn through 8 was of approximately 24 hours.

*Example 3*

We introduced into column A, through pipe 1, 102.3 kg. per hour of acetone which was less sharply rectified than that treated in Example 1 since its permanganate discoloration time was of 13 minutes. We also introduced, through pipe 4, 909 kg. per hour of water at 98° C. collected from the base of column B. The quantity of heat supplied to the base of column A amounted to 30,000 calories per hour.

We withdrew through pipe 6, 0.2 kg. per hour of upper layer containing:

0.1 kg. of partially soluble impurities of the same kinds as in Example 1,
0.04 kg. of acetone, and
0.06 kg. of water.

We withdrew through pipe 7, 3.9 kg. per hour of 30% strength aqueous impure acetone.

We refluxed to the top of column A 52.5 kg. per hour of this impure acetone solution.

Pure, 10% strength aqueous acetone flowed from the base of column A to column B through pipe 2. We withdrew through pipe 8, 100 kg. per hour of pure concentrated acetone, and through pipe 9, 1 kg. per hour of acetone heads. 1 kg. per hour of the same acetone heads was returned to column A through pipe 10.

The permanganate discoloration time of the pure concentrated acetone was of 22 hours; that of the acetone heads was of 3 hours.

*Example 4*

We started from strongly impure acetone (acetone heads) having the following composition:

| | Percent |
|---|---|
| Acetone | 95 |
| Esters | 3 |
| Aldehydes | 1 |
| Other impurities | 1 |

We operated as in Example 3, but the withdrawal through pipe 6 amounted to 0.4 kg. per hour of upper layer, the withdrawal through pipe 7 amounted to 8 kg. per hour, the withdrawal through pipe 9 amounted to 2 kg. per hour and the recycle through pipe 10 amounted to 2.5 kg. per hour.

The pure acetone withdrawn through pipe 8 had a permanganate discoloration time of 3 hours. The acetone heads withdrawn through pipe 9 had a permanganate discoloration time of 26 minutes.

*Example 5*

We started from a 50% aqueous acetone of substantially the same quality as the starting acetone in Example 1. We operated as in Example 1, except that the feed of aqueous acetone through pipe 1 amounted to 203 kg. per hour and the feed of substantially boiling water through pipe 4 amounted to 800 kg. per hour. The acetone withdrawn through pipe 8 had a permanganate discoloration time of 7 hours.

What we claim is:

1. A process which comprises feeding impure substantially acid-free acetone to the mid-section of a distilling column having a decanting plate adjacent the top of said column, said impure acetone containing a minor proportion of impurities boiling above 110° C. including higher alcohols and esters, while feeding water at approximately its boiling point to the column and flowing it on to said plate in an amount to keep the acetone concentration below the acetone feed-point at not over 15% by volume and between said feed-point and the top of the column at from 1% to 10% by volume, condensing the vapors from the top of the column, refluxing the condensate, and collecting impurities and water on the decanting plate said feed water passing into the column above said plate, discharging aqueous acetone in substantially pure form from the base of said column and removing a layer of impurities from said decanting plate.

2. A process in accordance with claim 1, in which the purified, aqueous acetone discharged from the base of the column has a strength of 2–10% by volume.

3. A process in accordance with claim 1, which further includes rectifying in a rectifying still the dilute aqueous solution of acetone withdrawn from the bottom of the distilling column, and using as the water to be fed to the top of said column, the boiling aqueous liquid obtained from the bottom of said rectifying still.

4. A process in accordance with claim 3, which further includes returning to the distilling column a portion of the liquid produced by condensation of the vapors from the rectifying still, the remainder of said liquid being partly refluxed to said still and partly discarded.

5. A process in accordance with claim 1, in which an amount of impurities not above 10 vol. percent of the acetone fed to the column is withdrawn from the decanting plate as an acetone-containing mixture having a high content of impurities.

6. A process in accordance with claim 5, in which the amount of impurities withdrawn from the top section of the column is about 1–2.5 vol. percent of the acetone fed to the column.

References Cited in the file of this patent

UNITED STATES PATENTS

| 2,283,911 | Brant et al. | May 26, 1942 |
| 2,290,442 | Metzl | July 21, 1942 |
| 2,514,967 | Pierotti | July 11, 1950 |
| 2,551,625 | Morrell et al. | May 8, 1951 |
| 2,607,719 | Eliott et al. | Aug. 19, 1952 |
| 2,635,992 | Carlson et al. | Apr. 21, 1953 |
| 2,662,848 | Emerson et al. | Dec. 15, 1953 |
| 2,669,541 | Catterall | Feb. 16, 1954 |
| 2,671,052 | Mitchell et al. | Mar. 2, 1954 |
| 2,690,993 | McGrath | Oct. 5, 1954 |
| 2,704,271 | Harrison et al. | Mar. 15, 1955 |